May 5, 1970 A. LANG 3,509,958
POWER STEERING APPARATUS, ESPECIALLY FOR MOTOR VEHICLES
Filed Oct. 9, 1967 6 Sheets-Sheet 1

Armin Lang
*Inventor* by *Albert Zalkind*
*Attorney*

Armin Lang
Inventor

Attorney

United States Patent Office 3,509,958
Patented May 5, 1970

3,509,958
POWER STEERING APPARATUS, ESPECIALLY FOR MOTOR VEHICLES
Armin Lang, Schwabisch, Gmund, Germany, assignor to Zahnradfabrik Friedrichshafen, Aktiengesellschaft, Friedrichshafen, Germany, a corporation of Germany
Filed Oct. 9, 1967, Ser. No. 673,757
Claims priority, application Germany, Oct. 18, 1966, Z 12,480
Int. Cl. B62d 5/08
U.S. Cl. 180—79.2           11 Claims

ABSTRACT OF THE DISCLOSURE

The invention relates to power steering mechanisms for motor vehicles which use oil pressure for actuating double acting cylinder servo motors of conventional double ended construction. The principal feature of the invention is the provision of a pair of small cylinders to effect power steering instead of a single large cylinder; either cylinder can produce the necessary steering force in the event of failure of the other cylinder. Normally both cylinders are operative; in the event, however, that there is a break in a pressure conduit or other occurrence whereby one cylinder loses its thrust effect, an increased oil pressure is exerted in the other cylinder so as to compensate for the loss of booster effect of the one cylinder.

A safety margin is thus provided so that booster effect is still retained to an extent necessary to steer the vehicle.

The known prior art is United States Pat. No. 2,020,951 in which a pressure pump and a positive displacement metering pump are used in a combination with a single cylinder utilizing a single hydraulic circuit system. In the event of breakdown of the system, all booster steering power is lost. By contrast, the present invention utilizes two hydraulic systems so that a breakdown of either system will not result in complete loss of power steering effect.

In summary, the invention comprises a pair of servo motors controlled by respective spool valves which are shifted by rotation of the vehicle's steering wheel to control flow from a pump driven by the engine. Such rotation also effects rotation of a dual type of positive displacement metering pump having a central pump gear with tooth segments acting in separate pump chambers. Such segments coact with the teeth of respective opposing gears in the respective chambers so that rotation by manual force of the central gear provides pump action and metering, through each chamber, of pressure oil from the engine driven pump to the valves. Depending upon direction of rotation of the central gear the flow direction will go from one valve to the other in two separate systems or paths to establish a pair of hydraulic circuits which can operate independently of each other.

Ordinarily, with the systems functioning normally, the metering pump will control discharge of pressure fluid which flows from one valve to the other in two paths, each through a metering chamber, and somewhat increases the pressure thereby. The overall circuitry arrangement provides for initial conduction of oil under pressure to each valve and the shifting of the valves then conducts pressure flow through the metering pump chambers in such a manner that the pressure fluid controlled by either valve for a respective servo motor must first pass through the other valve and thence through a chamber of the metering pump. This establishes the double hydraulic circuit system so that in the event of a high pressure conduit break on the pressure side of either servo motor the sudden loss in pressure in the respective control pump or metering pump chamber, on one side of the meshed gearing therein, results in such pump acting as a hydraulic motor due to the unbalance of pressure in that chamber.

Accordingly, pressure from the main, i.e., the supply pressure pump then drives the metering pump as a motor. This effect augments the pressure from the metering pump and the augmented pressure feeds to the other servo motor to increase its booster force above normal.

In another modification of the invention, automatically operating valves are utilized in the system which will shunt high pressure fluid from a broken line to the main pump inlet of the system, or, alternatively to the main pump outlet.

Figure 1:
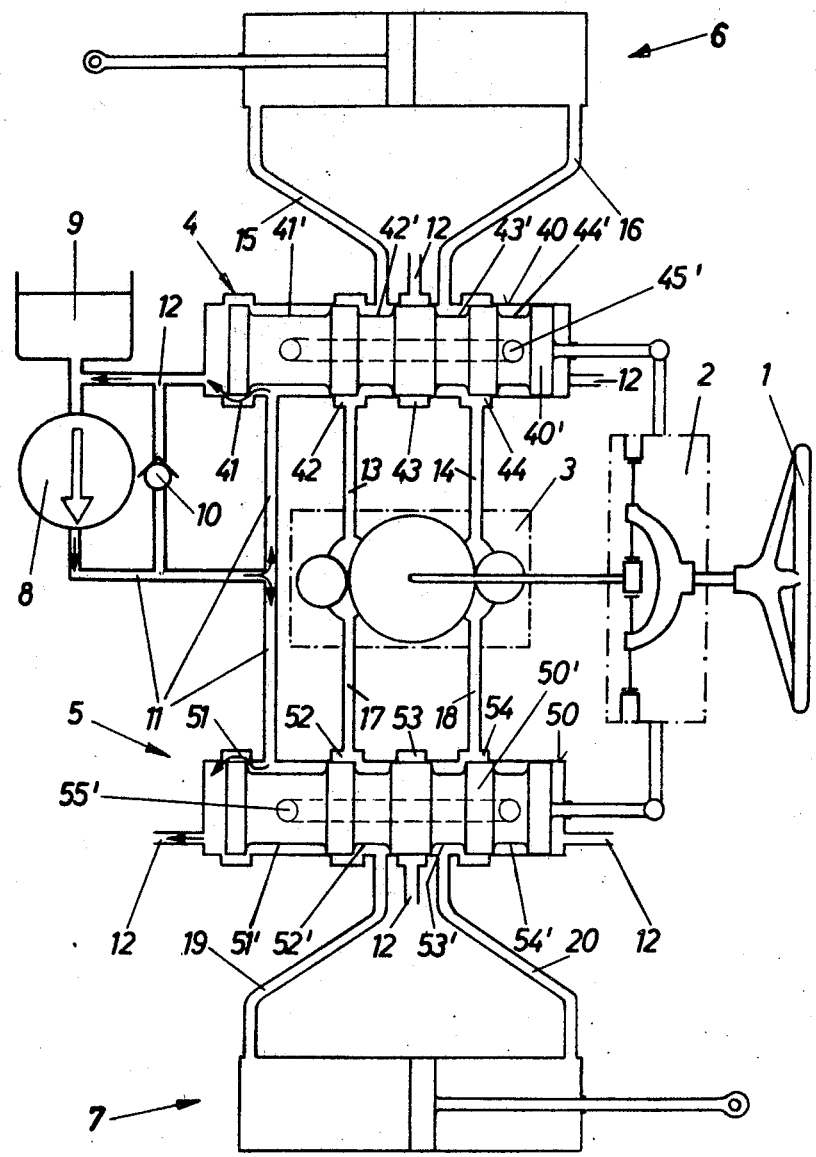
FIG. 1 is a symbolic representation of the double hydraulic system and its essential components in neutral, i.e., straight ahead steering position.

Referring now to FIG. 1 of the drawing, the combination comprises a steering wheel 1 coupled to rotate the bridge 26 of a planetary system 2 symbolically represented by the phantom rectangle. The planets 21 mesh with a sun gear 23 that drives the central gear of a positive displacement metering pump 3. The pump 3 is, in general, symbolically represented by the phantom lines. The gear arrangement is such that the sun gear is connected by a shaft 23' to the center gear of positive displacement metering pump 3 and rotates the center gear at a rate greater than the rotational rate of the steering wheel 1 due to the step up ratio of the planetary system. The orbit gear 22 of the phanetary system is connected to shift the multi-grooved valve spools 40' and 50' in multi-grooved valve housings 40 and 50, respectively, of valves 4 and 5. The spools are shifted in opposite directions, depending upon the direction of rotation of the steering wheel 1 to effect directional steering. The spool and housing grooves, and the lands therebetween coact in the usual manner. The shifting of the valve spools occurs during initial rotational movement of the steering wheel as a result of the normal play in the wheel.

The planetary gear system (FIG. 2) will be seen to be connected to the valve spools via arms 24 secured on a diameter of the orbit gear 22 and connected by rods to respective valve spools. Each of the levers 24 is articulated to a pair of springs 25. Each pair of springs 25 have their outer ends fixed and their inner ends acting against the lever so that as the lever is rotated around the axis of the orbit gear, one spring of the other in each pair of springs will be compressed or extended as the case may be depending upon whether compression or tension springs are used. The arrangement is obvious from the symbolic diagram of FIG. 2 and it will be appreciated that the pair of springs acting on respective levers will normally maintain the levers in vertical position for straight ahead steering by centralizing the valve spools.

Figure 2:
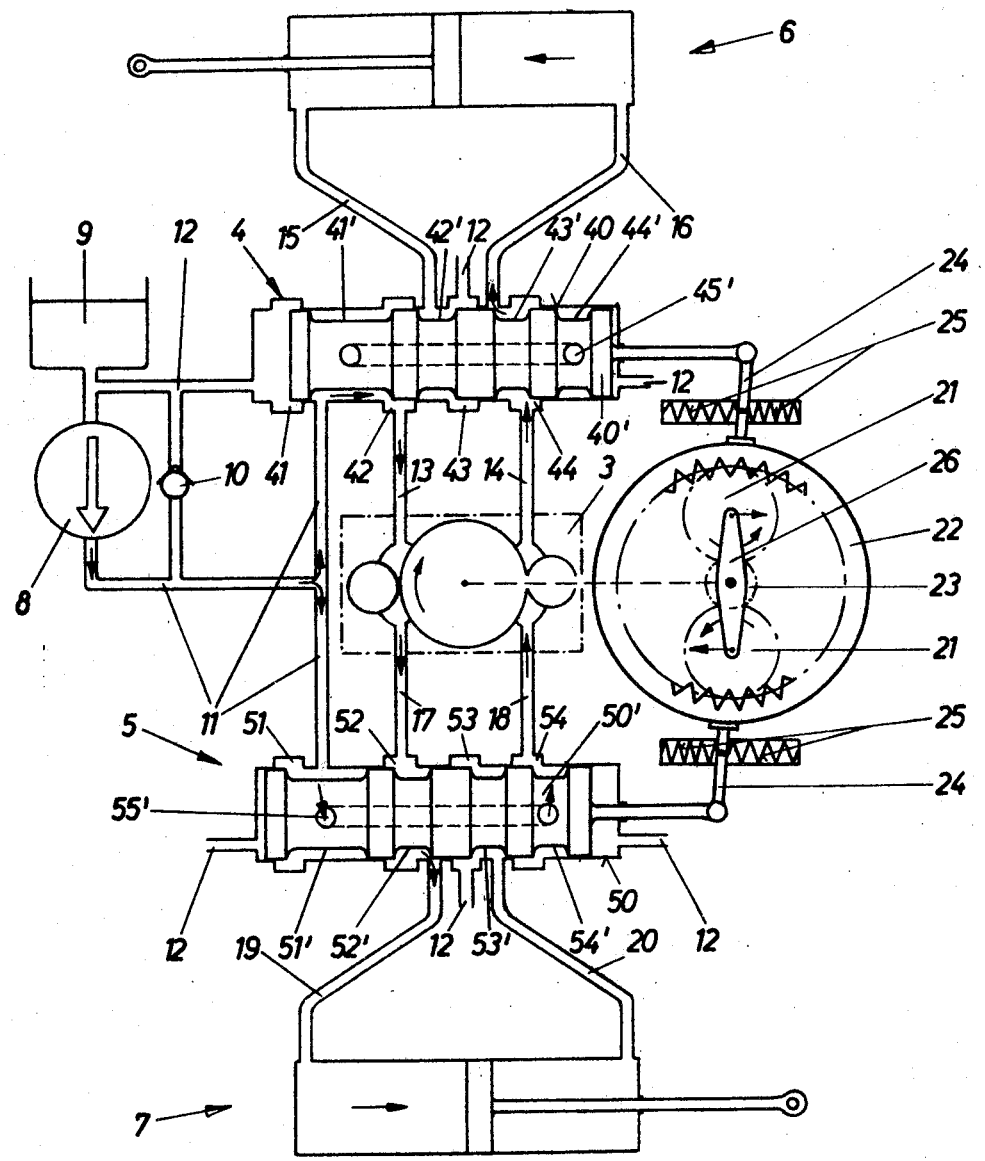
FIG. 2 shows the system with the valves in position for effecting booster steering power.

The orientation of the planetary gear of FIG. 2 at right angles to the showing of FIG. 1 is, of course, for purposes of illustration and any arrangement of linkages and levers may be utilized to achieve the purpose described, namely, reciprocation of the valve spools in opposite directions when the steering wheel 1 is rotated.

Oil is provided from a tank 9 to the intake of pressure pump 8 and from the outlet to left-hand ends of the valve housings by branch conduits 11, as shown. A bypass check valve 10 connects conduits 11 with a branch of exhaust conduits 12 connected to the left-hand end of valve 4. The valve 10 permits flow in the direction of pump flow so that in the event of failure of pump 8, fluid pressure can be furnished by means of the metering pump 3. It will be noted that all exhaust return conduits from the valves 4 and 5 are designated by the reference numeral 12 and will be understood to connect to tank 9.

Ordinarily, in the neutral position shown in FIG. 1 there is a constant circulating of pressure fluid via the pump 8 through conduits 11 and the grooves 41 and 51 of the valve housings to the respective return conduits 12. There is no flow between the valves, the servo-motors and the metering pump.

The valve 4 controls pressure fluid to the right-hand end of the servo motor 6 when the valve spool 40' is shifted to the right, as will be noted from FIG. 2, valve spool 50' being then shifted to the left. Thus, pressure fluid from the upper branch line 11 goes to the housing 40 adjacent the reduced portion 41' of the valve spool, adjacent groove 42, and thence to conduit 13 to one chamber of the metering pump 3 on the suction side of that chamber. Flow emerges through conduit 17 to the groove 52 of housing 50 adjacent the reduced portion 52' of valve spool 50' from whence it passes through conduit 19 to the left-hand end of servo motor 7.

In a similar maner, the downwardly directed branch of feed conduits 11 permits flow into the grooved portion 51 of valve 5 adjacent the reduced portion 51' of the valve spool but there the flow is blocked by the spool lands on the valve spool 50' on each side of portion 51'. However, flow takes place through a central bore 55' of the valve spool which has end openings at the reduced portions 51' and 54'. Accordingly, pressure flow can follow via housing groove 54 into conduit 18 to the suction side of the other chamber of metering pump 3 and thence at the outlet side via a conduit 14 to groove 44 of valve 4, adjacent the reduced portion 43' of the valve spool, whence it is led via conduit 16 to the right-hand end of servo motor 6.

From the above description it will be noted that pressure is fed to the servo motors at correspondingly opposite ends thereof and it will be understood that the pistons are connected, via the rods shown, to a steering mechanism in such a manner that the forces of the rods are additive, of course. It will be noted that the center gear of the metering pump 3 must be rotated by the steering wheel 1 in order for pressure fluid to reach the ends of the ends of the servo motors as described above. Thus, with the condition shown in FIG. 1 all fluid flow between the valves is blocked at the metering pump 3.

Each servo motor exhausts through its respective valve as will bereadily understood from FIGURE 2. Thus, the left-hand end of servo motor 6 exhausts through conduit 15 into the housing of valve 4 adjacent the reduced spool portion 42 and housing groove 43, whence it flows to the adjoining return conduit 12. Similarly, fluid from the right-hand end of servo motor 7 exhausts via conduit 20 to the valve 5 adjacent to the groove 53 and reduced spool portion 53', and thence to the adjoining return conduit 12.

Noting the complete symmetry of the arrangement it will be apparent that rotating the steering wheel so as to shift the valves in directions opposite to those shown in FIG. 2 will result in moving the pistons of the servo motors in directions opposite to those effected in FIG. 2. In such case, the right end port of bore 45' is unblocked to feed pressure oil to conduit 14, and the right end port of bore 55' is blocked cutting off pressure flow to conduit 18 which is connected to conduit 20. Flow is thus reversed through the conduits connected to metering pump 3 since conduit 17 is now open to the downwardly disposed feed branch 11 and conduit 13 is connected to conduit 15.

When a turn is being made, wheel 1 can be held in a rotated position while the vehicle (not shown) continues to turn since oil flow is blocked through pump 3, which is stationary when wheel 1 is held against rotation.

The invention has the advantages pointed out by virtue of the safety factor provided by the double hydraulic circuit, it being further noted that only one pressure pump 8 is required and therefore no additional expense is entailed insofar as a primary pressure source is concerned. Moreover, since two servo motors are used which are each smaller than a single large servo motor, accommodation in a vehicle is enhanced in many instances.

From the preceding description it will be apparent that a single pressure pump 8 feeds a double hydraulic ricuit where each circuit comprises a servo motor, both valves, a respective side of a dual metering pump, and return conduits and tank. These elements are combined with such interdependence that rotation of the steering wheel increases the pressure outputs of the metering pumps to the servo motors in proportion to the degree of rotation of the steering wheel.

A particular feature of the invention resides in the unique safety effect in the event of breakage of a high pressure conduit. For example, assuming a break in conduit 16 occurs during steering, the pressure drop in conduit 14 results in the right hand side of pump 3 being driven as a motor due to the high pressure in conduit 13 and in conduit 18. This increases the pressure output in conduit 17 through valve 5 to servo motor 7. The motor effect in pump 3 will take place even though no further force is being exerted on wheel 1 due to the planet gearing 2 which permits independent rotation of the center gear of pump 3. However, if the wheel 1 is being turned the motor force exerted on the center gear of pump 3 will be felt at wheel 1 by the operator who will then be aware that a conduit break has occurred. Since the operator knows his direction of steering he can immediately know in which conduit the break has occurred. The system provides suitable shut valves $v$ for the servo motor, conduits 15, 16, 19 and 20, located preferably adjacent the valves 4 and 5 and connecting such conduits to an adjacent return conduit 12. Thus, the operator can shunt oil to tank 9 so that the oil loss is minimized. Even if wheel 1 is held stationary in the course of making a steady steering turn, the sudden drag on the sung gear due to friction and inertia of the planet gears, in gearing 2, can be felt by the operator to apprise him of a conduit break.

FIGS. 3 to 6 illustrate a system which is essentially identical to the system shown in FIGS. 1 and 2 insofar as operation of the planetary gearing, the valve spools, the main pump, the metering pump 3, etc., are concerned. Thus, all reference numerals as found in FIGS. 1 and 2 will be found for the identical elements of the form of the invention shown in FIGS. 3—6.

Figure 3:
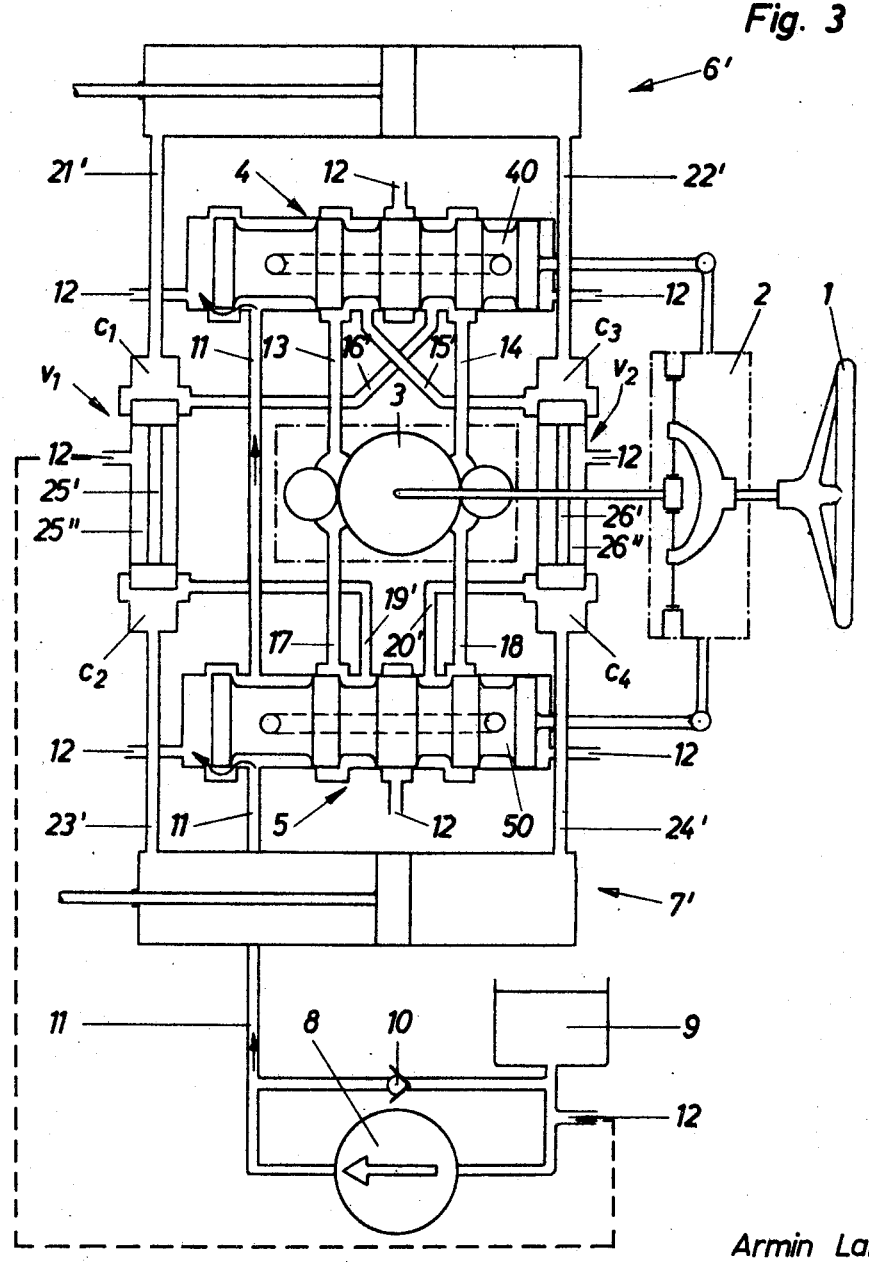
FIG. 3 shows a system which is virtually identical to the system shown in FIG. 1 except for the provision of valves which automatically shunt a broken high pressure conduit to the main pump inlet.

The modification consists of the provision of automatically operating valves $V_1$ and $V_2$ and their connections in the system so that the valve spools 25' and 26' are in a position maintained by pressure balance, as shown in FIG. 3. Thus, each of the valve spools comprises a pair of valve heads separated by a rod and of conventional construction. The valve spools are slidable in a casing as symbolically illustrated wherein the valve $V_1$ has one chamber $C_1$ connected via conduit 21' to an end of power cylinder 6' and the other chamber $C_2$ connected via conduit 23' to the corresponding chamber of power cylinder 7'. Similarly, the end chambers ($C_3$, $C_4$) of valve $V_2$ are connected via conduits 22' and 24' to the corresponding opposite ends of the power cylinders, respectively, 6' and 7'.

Figure 5:
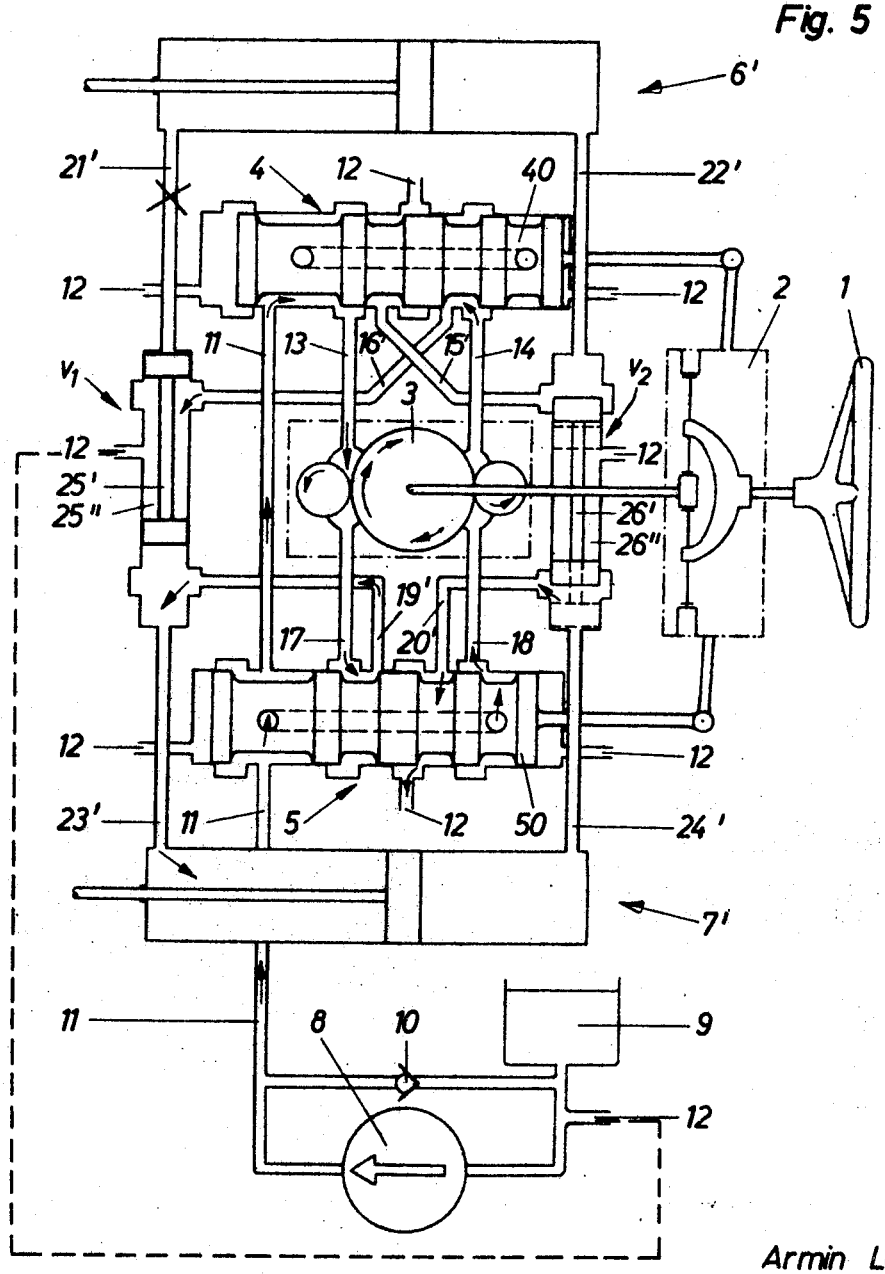
FIG. 5 illustrates the system and the flow directions for oil therein when a high pressure conduit is broken, connection being to the main pump inlet.
Figure 6:
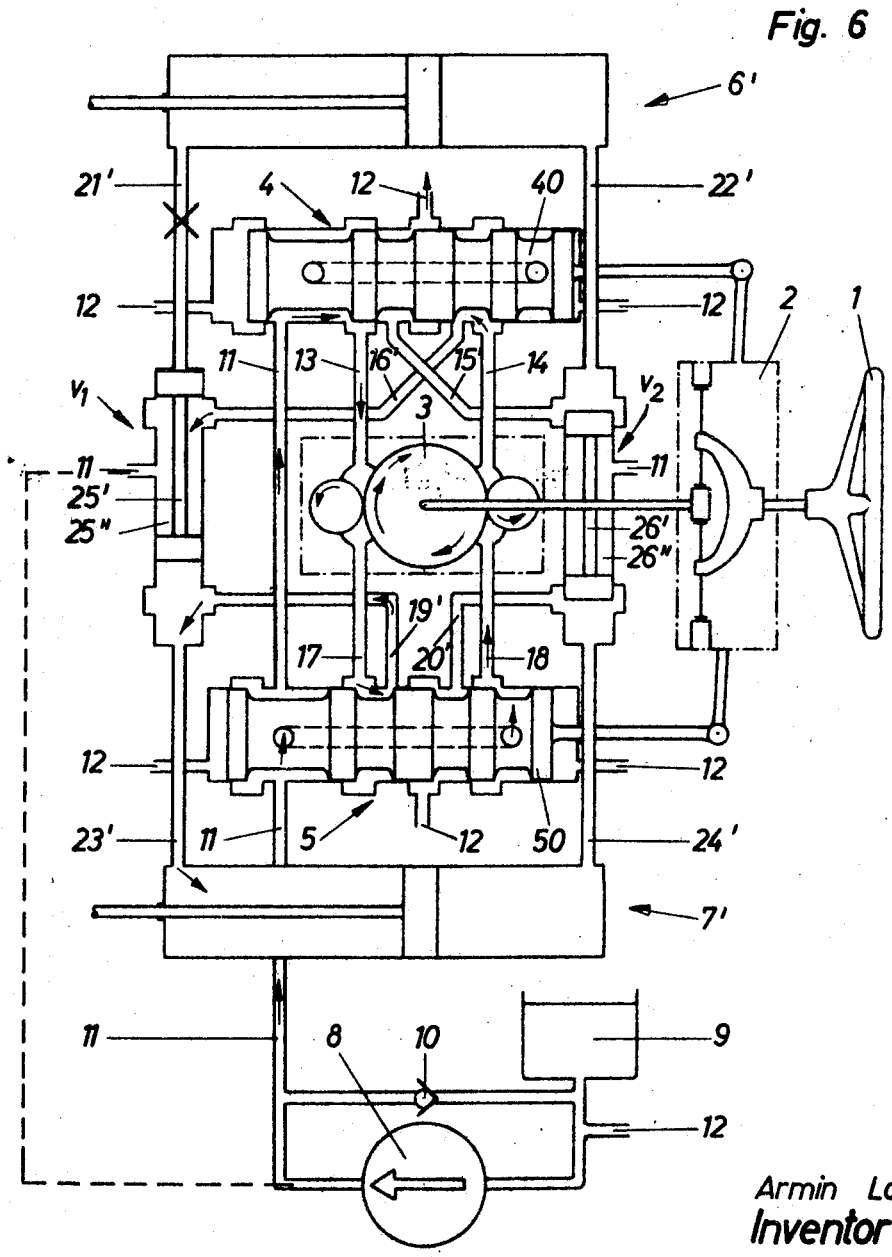
FIG. 6 illustrates the same condition as in FIG. 5 except that connection is to the outlet of the main pump.

The intermediate chamber portions of the automatic valves are designated as 25″ and 26″ and outlet connections means to the valve housing have reference numerals 11 or 12, depending on whether these outlets are connected to the main pump 8 outlet or inlet, respectively, as shown by comparison of FIG. 6 with FIG. 5, In FIG. 3 the system is static and flow is from the outlet pressure conduit 11 of the main pump 8 to the sump via the housing of spool valve 5 as occurs in the form of the invention shown in FIG. 1.

Figure 4:
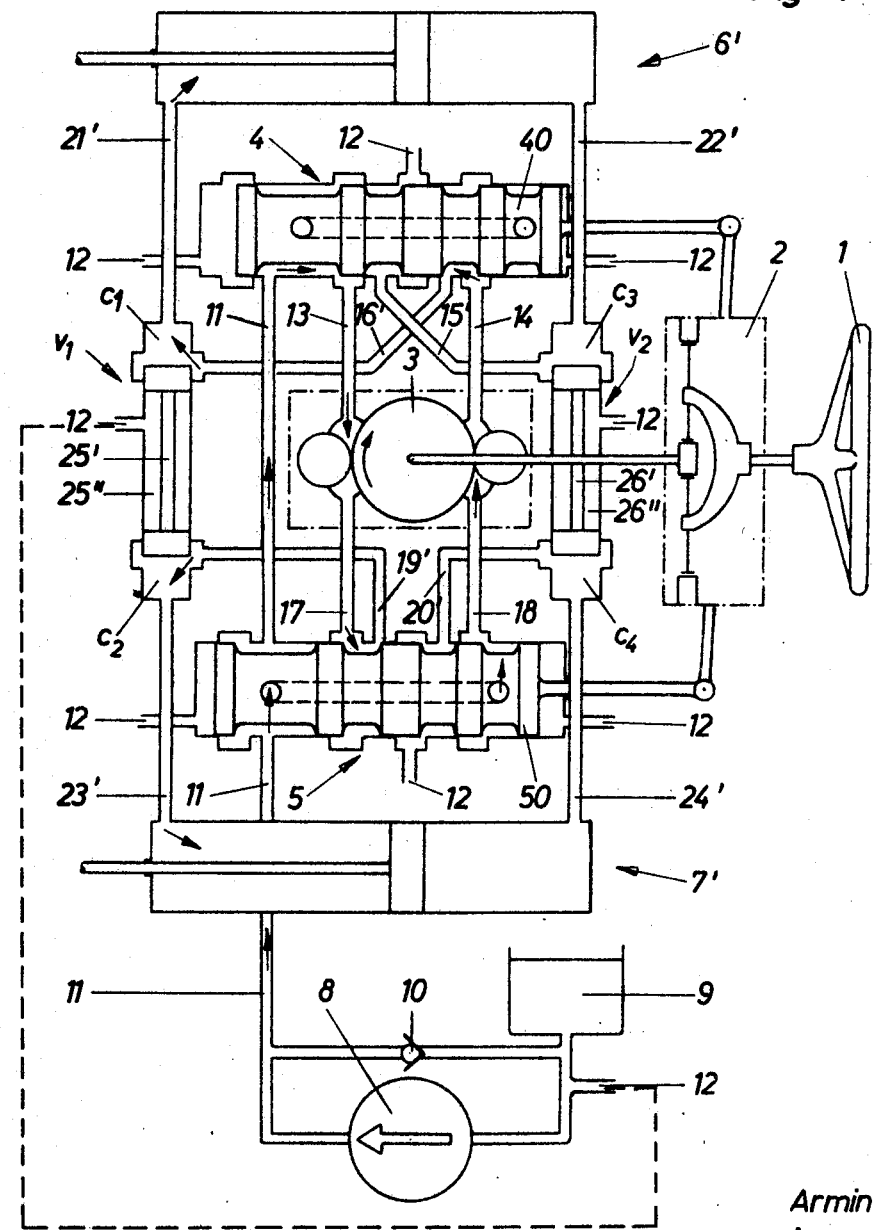
FIG. 4 illustrates the system of FIG. 3 in normal operation with high pressure fluid flowing to effect steering.

Referring now to FIG. 4, it will be noted that the valves 4 and 5 have been displaced by the steering wheel 1 whereby pressure from the main pump 8 is released to the left-hand chambers of the power cylinders 6′ and 7′. The flow from upstream, starting at pump 8, is indicated by downstream arrows therefrom throughout the system and need not be described in detail for the most part since this has already been done in connection with the form of the invention shown in FIGS. 1 and 2. However, it will be seen that high pressure feed flow goes through conduits 16′ and 19′ to the opposed chambers of valve $V_1$, and low exhaust pressure flow passes via conduits 15′ and 20′ to the opposed chambers of valve $V_2$. High feed pressure then goes downstream to respective ends of the servo motor cylinders 6′ and 7′, while exhaust flow goes to the outlet means of valve $V_2$ connected to the main pump 8 inlet system. Inasmuch as the feed pressure in the chambers of valve $V_1$ is the same, it will be apparent that due to the equal areas of the valve heads herein the valve spool 25′ is balanced by equal forces and there is, therefore, no movement of the valve spool. Similarly, low pressure in the chambers of valve $V_2$ balances the valve spool against movement.

Assuming, however, that a break occurs in the conduit 21′ at the portion indicated in FIG. 5, since this conduit has been carrying high pressure to the left-hand chamber of power cylinder 6′, it will be obvious that there is an immediate drop in pressure in the upper chamber of valve $V_1$. The high pressure in the lower chamber via conduit 19′ still remains and, therefore, the valve spool 25′ has been forced to the upper portion shown in FIG. 5. This cuts off the high pressure flow from conduit 16′, which flow is then shunted from the valve $V_1$ outlet via conduit 12 connected thereto to the inlet system of the main pump through a conduit represented by the dotted line of FIG. 5.

From the symmetry of the system it will be understood that a break in any of the other conduits 22′, 23′ or 24′ when conducting feed pressure will have precisely the same effect, namely, the shunting of high pressure fluid back to the pump inlet system. Thus, such shunting effect for a break in conduit 22′ will be via the valve $V_2$ as the valve spool 26′ is forced upwardly. Similarly, a break in conduit 23′ or 24′ will be via valve $V_1$ or $V_2$, respectively, since the valve spools 25′ or 26′ will be forced downwardly by an unbalance of pressure. Such reverse position is shown for the valve spool 26′, as indicated by the dotted lines in the housing of valve $V_2$ (FIG. 5).

FIG. 6 is identical to FIG. 5 except that the outlet means of the valves $V_1$ and $V_2$ is connected to the outlet pressure side 11 of the main pump 8, such connection being indicated by the dotted line for the valve $V_1$ but being understood to be present for the valve $V_2$ although omitted for purposes of clarity in the diagram.

The differences between connecting the automatic valves to the inlet or the outlet of the pump resides in the fact that where connection is made through the inlet, the augmented pressure produced by the metering pump 3 acting as a motor, as heretofore described in connection with FIGS. 1 and 2, is nearly doubled. This has the effect of almost doubling the force of the cylinder 6′ or 7′, whichever remains operative after the conduit break, so that there is no substantial decrease in booster steering power. There is, however, a greater strain on the system connected with that cylinder due to the increased pressure. Accordingly, where such greater strain is undesirable, connection from the automatic valves to the pump outlet system can be had since this does not cause any increase in pressure acting on the remaining power cylinder yet in operation; the fact that such cylinder remains in operation serves the primary purpose of the invention, in that booster power is still available.

It will be understood that many conduit connections may be formed as part of the housing, e.g., between valves 4, 5, $V_1$, $V_2$ and the metering pump 3, etc., to minimize breakage possibility. However, certain connections must be exterior tubes, e.g., to the servo motors the main pump inlet and outlet systems.

Assuming a break of conduit 21′ occurs during steering, the high pressure in conduit 21′ falls to atmospheric pressure. As a result the valve spool 25′ will be forced upwardly by an unbalance of pressure, so that conduits 14 and 16′ are connected to the pressureless conduit 12. The high pressure difference between the conduits 13; 14 and 18; 14 takes effect on metering pump 3 acting as a motor and almost doubling the force of the cylinder 7.

If in case of a breakage of one of the conduits 21′, 22′, 23′, 24′ an augmentation of the working pressure in the servo motor yet in operation is not desired, the outlet means of the valves $V_1$ and $V_2$ are connected to the feed pressure side 11 of the main pump 8 (FIG. 6). In this case the pressure difference occurring on the metering pump 3 is almost zero.

What is claimed is:

1. A power steering system comprising a pair of double acting cylinder servo motors (6, 7); a pair of actuatable valves (4, 5); means (11) for connecting said valves to a source (8) of fluid pressure; means whereby each of said valves is connected to control flow to a respective servo motor; said system also comprising a positive displacement metering pump means (3) operable by a steering spindle and actuable thereby to pass flow therethrough from said fluid pressure source via said valves; said metering pump having two flow paths, each path being connected to both said valves; said valves having passages operative to conduct flow therebetween simultaneously through said paths of said metering pump means when said valves and metering pump means are actuated; wherein pressure flow from said source of fluid pressure passes initially from one valve through a flow path of said metering pump means to the other valve and thence to the respective servo motor of said other valve; and wherein pressure flow passes from said other valve through the other path of said metering pump means to said one valve for flow therethrough to the respective servo motor thereof; whereby two hydraulic circuits are established each comprising a servo motor, both valves, and said metering pump means.

2. A power steering system as set forth in claim 1, each said servo motor having ends connected for flow pressure communication to respective actuatable valves.

3. A power steering system as set forth in claim 2, and respective connection means (15′, 16′, 19′, 20′, 21′, 22′, 23′, 24′) for effecting connections of said cylinder ends to said actuatable valves, and automatically operable pressure operated valve means ($V_1$, $V_2$) inserted in said connection means operative to cut off flow to a respective cylinder end in the event of a drop in pressure in the connection means.

4. A power steering system comprising a pair of double acting cylinder servo motors (6, 7); a pair of actuatable valves (4, 5); means (11) for connecting said valves to a source (8) of fluid pressure; means whereby each of said valves is connected to control flow to a respective servo motor; said system also comprising a positive displacement metering pump means (3) operable by a steering spindle and actuable thereby to pass flow therethrough from said fluid pressure source via said valves; said metering pump having two flow paths therein and being connected to said valves and operative to conduct flow between valves simultaneously through said paths of said metering pump means when said valves and metering pump means are actuated; wherein pressure flow from said source of fluid pressure passes initially from one valve through a flow path of said metering pump means to the other valve and thence to the respective servo motor of said other valve; and wherein pressure flow passes from said other valve through the other path of said metering pump means to said one valve for flow therethrough to the respective servo motor thereof; whereby two hydraulic circuits are established each comprising a servo motor, both valves, and said metering pump means, wherein said metering pump means comprises a positive gear type pump in each said path, and having a common drive so that either of said gear pumps can be driven as a hydraulic motor in the event of substantial loss of pressure in one of the paths downstream of said metering pump means while said valves are in actuated condition so as to augment the pressure in the other path to effect an increased force in the servo motor fed therethrough.

5. A power steering system comprising a pair of double acting cylinder servo motors (6, 7); a pair of actuable valves (4, 5); means (11) for connecting said valves to a source (8) of fluid pressure; means whereby each of said valves is connected to control flow to a respective servo motor; said system also comprising a positive displacement metering pump means (3) operable by a steering spindle and actuable thereby to pass flow therethrough from said fluid pressure source via said valves; said metering pump having two flow paths therein and being connected to said valves and operative to conduct flow between valves simultaneously through said paths of said metering pump means when said valves and metering pump means are actuated; wherein pressure flow from said source of fluid pressure passes initially from one valve through a flow path of said metering pump means to the other valve and thence to the respective servo motor of said other valve; and wherein pressure flow passes froms said other valve through the other path of said metering pump means to said one valve for flow therethrough to the respective servo motor thereof; whereby two hydraulic circuits are established each comprising a servo motor, both valves, and said metering pump means, each of said servo motors having ends for reversible flow operation; each of said valves comprising a multi-grooved valve spool having spaced valve heads; and a multi-grooved valve housing coacting with respective valve spools; each of said valve spools having a bore (45', 55') therethrough effecting communication between grooves thereof; a pair of flow connections (13, 14, 17 and 18) from respective grooves of each valve housing to said metering pump means; said metering pump means having a pair of metering pump chambers wherein each chamber is separately connected to respective grooves of said valve housings; a pair of conduit connections (15, 16) (19, 20) from each valve to a respective servo motor cylinder end; whereby shifting of said valves is operative to conduct feed pressure fluid from one valve (4) through one metering pump chamber to the other valve (5) and also to the bore (55') of the valve spool thereof and from said one valve (4) through said other valve (5) to and end of the respective servo motor cylinder and also through said bore (55') of said other valve (5) to the other metering pump chamber and therefrom to said one valve (4) and therethrough to an end of the respective servo motor.

6. A power steering system as set forth in claim 5, said system also including a pair of pressure operated valve means ($V_1$, $V_2$) and connections (15', 16', 19', 20') therefor intermediate said actuable valves (4, 5) and said cylinder ends whereby feed pressure passes through said pressure operated valve means to said cylinder ends from said actuable valves; each said pressure operated valve means having outlet means (11 or 12) and having an element (25', 26') operative to normally maintain a position by balanced pressure forces acting thereon whereat pressure flow through the respective pressure operated valve means is cut off from respective outlet means; and each said element being movable in response to a drop in pressure in a connection to a cylinder and effecting a pressure unbalance on said element to shunt pressure flow to the respective outlet means.

7. A power steering system comprising a pair of double acting cylinder servo motors (6, 7); a pair of actuatable valves (4, 5); means (11) for connecting said valves to a source (8) of fluid pressure; means whereby each of said valves is connected to control flow to a respective servo motor; said system also comprising a positive displacement metering pump means (3) operable by a steering spindle and actuable thereby to pass flow therethrough from said fluid pressure source via said valves; said metering pump having two flow paths therein and being connected to said valves and operative to conduct flow between valves simultaneously through said paths of said metering pump means when said valves and metering pump means are actuated; wherein pressure flow from said source of fluid pressure passes initially from one valve through a flow path of said metering pump means to the other valve and thence to the respective servo motor of said other valve; and wherein pressure flow passes from said other valve through the other path of said metering pump means to said one valve for flow therethrough to the respective servo motor thereof; whereby two hydraulic circuits are established each comprising a servo motor, both valves, and said metering pump means, including automatic double acting pressure operated valve means ($V_1$) having chamber means ($C_1$, $C_2$) and having a valve spool means (25') with valve head means exposed to system feed pressure in respective chamber means; connection means (16', 19') in said system whereby said valve head means is normally subject to equal forces of feed pressure controlled by said actuable valves (4, 5); said valve spool means being thus normally balanced against movement; an outlet means (11 or 12) for said pressure operated valve means; said valve spool means being movable due to unbalance of pressure acting on the valve head means in the respective chamber means in response to a drop in pressure of the fluid flow between an actuatable valve (4 or 5) and a respective servo motor (6, 7) to shunt flow to the outlet means of said pressure operated valve means.

8. A power steering system comprising a pair of double acting cylinder servo motors (6, 7); a pair of actuatable valves (4, 5); means (11) for connecting said valves to a source (8) of fluid pressure; means whereby each of said valves is connected to control flow to a respective servo motor; said system also comprising a positive displacement metering pump means (3) operable by a steering spindle and actuable thereby to pass flow therethrough from said fluid pressure source via said valves; said metering pump having two flow paths therein and being connected to said valves and operative to conduct flow between valves simultaneously through said paths of said metering pump means when said valves and metering pump means are actuated; wherein pressure flow from said source of fluid pressure passes initially from one valve through a flow path of said metering pump means to the other valve and thence to the respective servo motor of said other valve; and wherein pressure flow passes from said other valve through the other path of said metering pump means to said one valve for flow therethrough to the respective servo motor thereof; whereby two hydraulic circuits are established each comprising a servo motor, both valves, and said metering pump means, said servo motors being double ended (6, 7), a pair of automatic double acting pressure operated valves ($V_1$, $V_2$) each having a pair of chambers ($C_1$, $C_2$) ($C_3$, $C_4$) and each chamber having a respective conduit connection (21', 22', 23', 24') to a cylinder end; each said pressure operated valve having a valve spool (25', 26') with a valve head exposed to pressure in a respective chamber; connection means (16', 19') (15', 20') in said system whereby said valve heads are normally subjected in their respective chambers to equal forces of feed or exhaust pressure as determined by said actuatable valves (4, 5); said valve spools being thus normally balanced against movement; an outlet means (11, 12) for each pressure operated valve; each valve spool being movable due to unbalance of pressure in the respective chambers thereof in response to a conduit connection break between a chamber and a respective cylinder end, while conducting feed pressure, to shunt flow from said chamber to the respective outlet means of the respective pressure operated valve.

9. A power steering system as set forth in claim 8, said outlet means for each pressure operated valve being connected to the source (8) of fluid pressure.

10. A power steering system as set forth in claim 9, said source of fluid pressure comprising a pump having an inlet (11) and an outlet (12), and said outlet means being connected to said pump inlet (11).

11. A power steering system comprising a pair of double acting cylinder servo motors (6, 7); a pair of actuatable valves (4, 5); means (11) for connecting said valves to a source (8) of fluid pressure; means whereby each of said valves is connected to control flow to a respective servo motor; said system also comprising a positive displacement metering pump means (3) operable by a steering spindle and actuable thereby to pass flow therethrough from said fluid pressure source via said valves; said metering pump having two flow paths therein and being connected to said valves and operative to conduct flow between valves simultaneously through said paths of said metering pump means when said valves and metering pump means are actuated; wherein pressure flow from said source of fluid pressure passes initially from one valve through a flow path of said metering pump means to the other valve and thence to the respective servo motor of said other valve; and wherein pressure flow passes from said other valve through the other path of said metering pump means to said one valve for flow therethrough to the respective servo motor thereof; whereby two hydraulic circuits are established each comprising a servo motor, both valves, and said metering pump means, wherein said metering pump means is constructed and arranged to be driven as a hydraulic motor in the event of substantial loss of pressure in one of the paths downstream of said metering pump means while said valves are in actuated condition so as to augment the pressure in the other path to effect an increased force in the servo motor fed therethrough wherein said gear pumps comprise respective chambers with a central pumping gear having a portion in each said chamber and a coacting pumping gear in each said chamber meshing with a respective portion of said central pumping gear, each of said paths comprising one of said chambers, wherein each of said hydraulic circuits comprises a respective pump chamber of said gear pump, wherein said valves and said gear pump are reversibly actuatable, and means for actuating said valves and said gear pump comprising a steering wheel (1) a planet carrier (26) rotatively connected thereto, planet gears (21), a sun gear (23) meshing with said planet gears and coupled to said central gear of said gear pump for rotation thereof, an orbit gear 22, and means (24) coupling said valves to said orbit gear for actuation thereof.

References Cited

UNITED STATES PATENTS

| | | | |
|---|---|---|---|
| 2,321,377 | 6/1943 | French | 180—79.2 |
| 2,640,322 | 6/1953 | Puerner | 180—79.2 X |
| 2,918,135 | 12/1959 | Wittren | 180—79.2 |
| 3,162,014 | 12/1964 | Mercier et al. | |
| 3,207,254 | 9/1965 | De Venel | 180—79.2 |

LEO FRIAGLIA, Primary Examiner

J. A. PEKAR, Assistant Examiner

U.S. Cl. X.R.

60—52